United States Patent [19]
Harrod et al.

[11] Patent Number: 4,823,632
[45] Date of Patent: Apr. 25, 1989

[54] GEAR BOX ASSEMBLY

[75] Inventors: Lawrence R. Harrod, Fort Wayne; Michael R. Siebern, Angola, both of Ind.

[73] Assignee: Kransco, San Francisco, Calif.

[21] Appl. No.: 85,468

[22] Filed: Aug. 12, 1987

[51] Int. Cl.$^4$ .......................... F16H 3/22; F16H 5/06; F16H 57/02; A63H 17/00
[52] U.S. Cl. .................................. 74/342; 74/337.5; 74/421 A; 74/606 R; 446/463; 446/469
[58] Field of Search .............. 446/463, 457, 469, 462; 74/337.5, 342, 341, 421 A, 606 R; 403/356, 358; 474/903

[56] References Cited

U.S. PATENT DOCUMENTS

| | | | |
|---|---|---|---|
| 818,662 | 4/1906 | Buffum | 74/345 |
| 1,231,655 | 7/1917 | Schmidt | 74/342 |
| 1,257,309 | 2/1918 | Brand | 74/342 |
| 1,736,680 | 11/1929 | Toliver | 74/342 |
| 1,911,022 | 5/1933 | Haag | 74/342 |
| 2,079,903 | 5/1937 | Eberhard | 74/342 |
| 2,396,456 | 3/1946 | Campodonico | 74/330 |
| 2,853,889 | 9/1958 | Quayle | 74/477 |
| 2,911,841 | 11/1959 | Miller | 74/342 |
| 3,217,584 | 11/1965 | Amesbury | 411/508 |
| 3,538,640 | 11/1970 | Hayes et al. | 446/463 |
| 3,955,429 | 5/1976 | Holden | 446/462 |
| 4,152,866 | 5/1979 | Suda | 446/463 |
| 4,187,733 | 2/1980 | Walther et al. | 74/342 |
| 4,216,612 | 8/1980 | Erickson et al. | 446/290 |
| 4,475,618 | 10/1984 | Kennedy et al. | 180/237 |
| 4,488,375 | 12/1984 | Cheng | 446/463 |
| 4,550,625 | 11/1985 | Martin et al. | 74/335 |
| 4,563,913 | 1/1986 | Hartz et al. | 74/606 R |
| 4,573,943 | 3/1986 | Kennedy et al. | 446/463 |

FOREIGN PATENT DOCUMENTS 0226033 2/1963 Austria .................................. 74/342

Primary Examiner—Dirk Wright
Assistant Examiner—Harold F. Macris
Attorney, Agent, or Firm—Kolisch, Hartwell & Dickinson

[57] ABSTRACT

A toy vehicle transmission assembly unit having a drive gear that is nonrotatably mounted on a driven axle, and a multiple gear train that establishes a driving connection between the drive gear and a driving gear mounted on a shaft outwardly extending from a motor. The gear of the multiple gear train that immediately establishes the driving connection with the drive gear is shifted laterally by a shift lever that disengages the gear train from the drive gear. The transmission assembly unit is enclosed in a housing that provides a rotatable mounting for the drive gear.

7 Claims, 2 Drawing Sheets

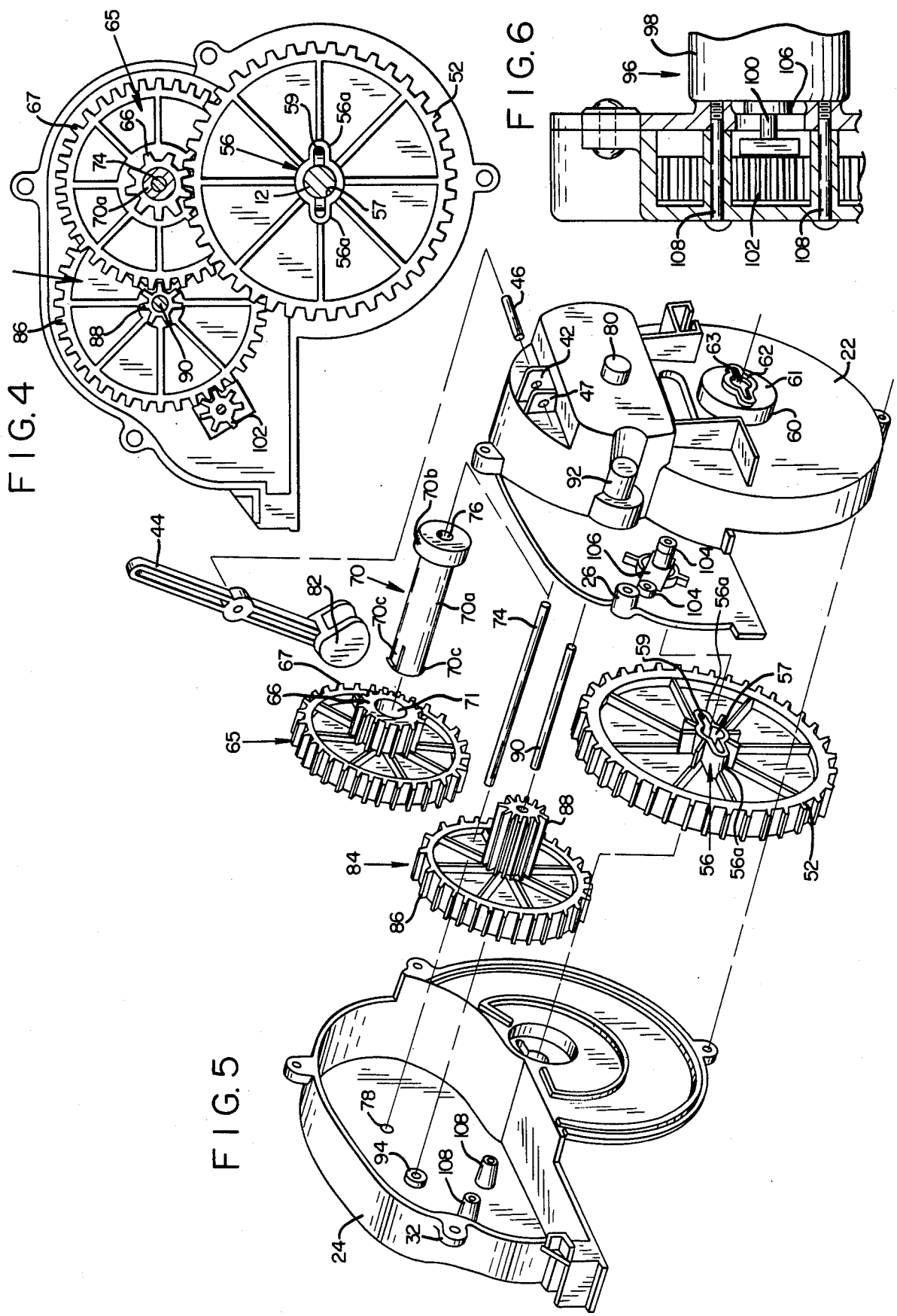

GEAR BOX ASSEMBLY

BACKGROUND AND SUMMARY OF THE INVENTION

The present invention relates to toy vehicles, and more particularly, to a novel transmission assembly unit that transmits power from the toy vehicle's motor to the driven axle.

Usually, toy vehicle transmissions drive the vehicle wheels directly. Thus, the vehicle is unable to coast in a neutral mode because of the direct engagement of the gear train to the wheels. Further, many toy vehicle transmissions are constructed with the gears of the gear train in an in-line configuration, or one directly following another. The in-line construction results in a transmission assembly which is relatively large in size, and correspondingly difficult to fit on a small toy vehicle frame.

Moreover, another problem encountered by manufacturers of toy vehicle transmissions is that the transmission assembly must be of simple construction to limit cost, yet durable enough to withstand the often times destructive way that a child uses the vehicle.

If a transmission is to permit disengagement of gears whereby the vehicle wheels rotate freely, for cost and simplicity reasons, this should be performable in a foolproof manner and with minimal linkage structure.

A general object of this invention is to provide a unique toy vehicle transmission assembly unit that is constructed in a simple, yet durable fashion.

Another object is to provide a toy vehicle transmission assembly unit that has a compact construction, thereby facilitating the placement of the transmission assembly on a toy vehicle frame.

Yet another object is to provide a toy vehicle transmission assembly unit featuring a drive gear nonrotatably secured to the driven axle or shaft of the vehicle, and a manually shiftable gear, shiftable between positions engaging and disengaging the drive gear to produce driving and neutral modes of operation.

The transmission assembly unit contemplated in a preferred embodiment of the invention features a multiple-gear gear train, where the gears of the gear train rotate about axes extending transversely of the vehicle and are clustered about and terminate in a drive gear which normally is the lower most gear in the gear train and is nonrotatably secured to the drive axle or shaft of the vehicle. A motor driven, driving gear introduces drive to the gear train and is laterally offset from, i.e., to one side of, the drive gear described. The entire organization permits, in a compact manner easily incorporated with a toy vehicle, suitable gear reduction between the motor driven driving gear and final driven gear. The gear in the gear train which is shifted to permit either free rotation of the drive axle or a driving connection with the drive axle is disposed directly above the drive gear described, and is actuated by a shift lever readily accessible to the operator of the vehicle.

In a preferred embodiment of the invention, the drive gear driving the drive axle includes, as an integral part thereof, hub portions on opposite sides of the drive gear rotatably mounted in sleeve portions or bushing portions, which are an integral part of the transmission housing. The transmission housing may be made up of two mating sections which are secured together in opposed relation to provide a housing or covering for the gears and the gear train. Any motor provided to drive the gear train may be in the form of an electric motor mounted on the gear train housing by securement of the motor housing to the gear train housing. A gear secured to the output shaft of the motor is the driving gear, introducing drive to the drive gears of the transmission unit.

These and other objects and advantages are obtained by the invention, which is described below in conjunction with the accompanying drawings:

BRIEF DESCRIPTION OF THE DRAWINGS

FIG. 4 is a frontal-plan view of the transmission assembly unit, taken generally along the line 4—4 in FIG. 3;

FIG. 5 is an exploded view of the transmission assembly unit; and

FIG. 6 is a view of an electric motor, taken generally along the line 6—6 in FIG. 2.

DETAILED DESCRIPTION OF THE PREFERRED EMBODIMENT OF THE INVENTION

Figure 1:
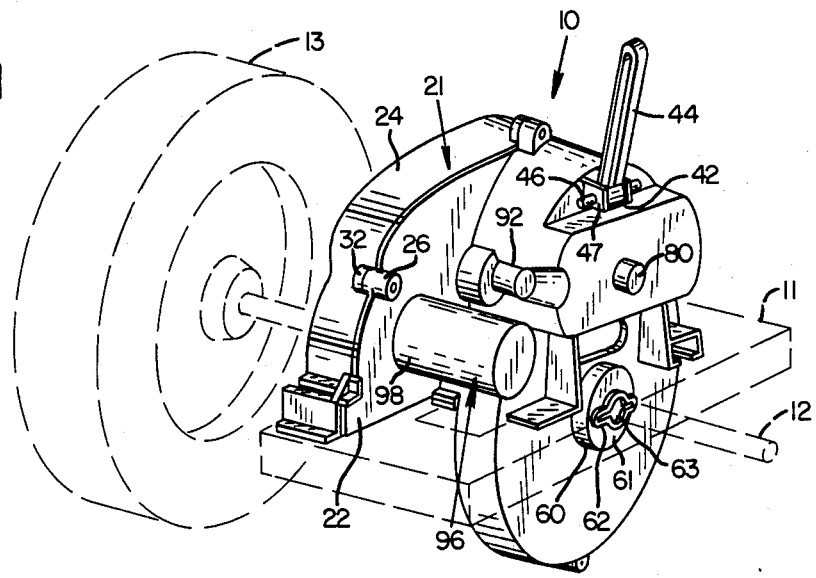
FIG. 1 is a perspective view of the transmission assembly unit mounted on portions of a vehicle frame, and connected to a drive axle.

Referring now to the drawings, and more particularly to FIG. 1, illustrated is a transmission assembly unit 10 suitably mounted on a frame of a toy vehicle, portions of which are shown in dashed outline at 11. Details of the frame will differ depending on the vehicle involved, and form no part of the invention.

Driven by the transmission unit is a driven axle 12. Axle 12 suitably mounts on its opposite ends, driving wheels for the vehicle, one of which is shown at 13. Again, the particular type of driving wheel and its mounting on axle 12 is subject to variation depending upon the vehicle.

Considering now details of the transmission assembly unit 10, such is enclosed in a housing 21, comprising front housing section 22 and rear housing section 24, the housing sections mating with each other and being disposed in opposed relationship. These housing sections are connected together in the transmission unit by fastening means or screws 25 (see FIG. 3) extending between bosses, such as the boss 26 forming part of housing section 22, and ears, such as ear 32 forming part of housing section 24.

Housing section 22 includes an opening 42 adjacent the top thereof through which a gear shift lever 44 extends. The shift lever is pivotally mounted on the front section by means of a pin 46 which extends through the lever and has ends mounted on tabs, such as tab 47 which is an integral part of the front housing section.

Figure 2:
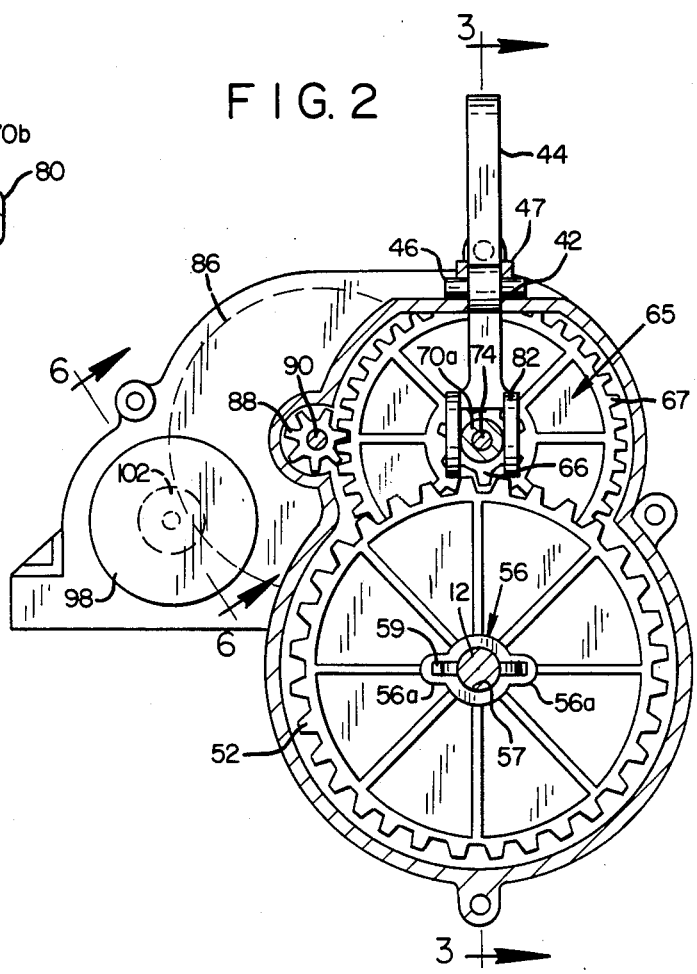
FIG. 2 is a frontal-plan view of the transmission assembly unit of FIG. 1, with portions of a housing in the unit broken away to show detail.

Considering now the gear train which is housed within the housing and forms part of the transmission unit assembly as a whole, a drive gear 52 is rotatably supported in a lower portion of the transmission housing. Such may be made of, for instance, a molded plastic and may include raised ribs for strengthening and the usual plural teeth extending about its perimeter. Centrally of the drive gear, on each side of the gear and forming an integral part of the gear, is a hub 56. The hub, i.e., viewing the end of the hub as shown in FIG. 2, includes projections 56a on opposite sides thereof, imparting a wing shape to the hub. Extending centrally through the hub is a bore 57 which includes a substantially cylindrical central portion, and an elongate channel such as the one shown in 59 on opposite sides of this central portion and joining with this central portion. The cylindrical portion and channels together impart a noncircular cross section to the passage which extends through the center of the drive gear.

Drive gear 52 is rotatably mounted within the housing with hub 56 rotatably received within sleeve portions 60 formed in housing sections 24, 22. As probably best illustrated in FIG. 5, each sleeve portion 60 is closed off by an end wall 61 which overlies an end of a hub 56 thus to restrain the drive gear from shifting axially on shaft 12. Each end wall is provided with a flange 62, circumscribing an opening 63 of wing-shaped cross section, generally corresponding to the cross section of the passage extending through the center of gear 52.

Figure 3:
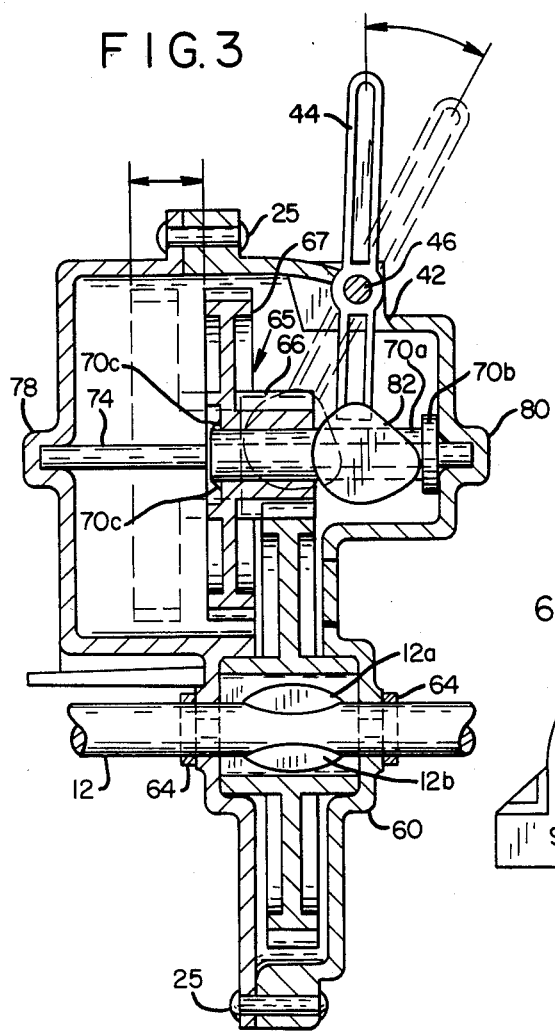
FIG. 3 is a side-sectional view of the transmission assembly unit, taken generally along the line 3—3 in FIG. 2.

Driven axle or shaft 12 has earlier been described extending through the transmission unit. As can be seen in FIG. 3, the shaft between its ends is peened or otherwise machined to have ridge portions 12a, 12b presented at opposite sides thereof projecting radially of the shaft a distance greater than the radius of the ends of the shaft. In mounting the shaft with such extending through drive gear 52, the opening extending through the center of the drive gear is registerably aligned with the opening, such as opening 63 provided on opposite sides of the transmission housing. This permits the shaft to be inserted into the transmission housing and through the center of the drive gear with lodging of the ridge portions 12a, 12b in channels 56a extending along the interior of the hub. In this way, a nonrotatable connection is established between the drive gear and shaft. Suitable means is provided for preventing axial movement of the shaft relative to the drive gear. Such may be done by securing collars, such as collar 64 circumscribing driven axle 12 in regions where such projects outwardly from opposite sides of the transmission housing, although alternative arrangements and constructions are, of course, possible.

Disposed above drive gear 52 is a compound gear 65. This gear may also be made of molded plastic and includes a pinion gear 66, and as an integral part thereof, a larger gear gear 67 disposed to one side of the pinion gear.

Shown at 70 is an elongate shifting sleeve element which includes a sleeve section 70a extending most of its length, flange means 70b forming one end of the element, and yieldable snap fingers 70c presented at the opposite end of the element. Gear 65 has a bore 71 extending therethrough. The compound gear is securely mounted on one end of the shifting sleeve element by passing the end of the sleeve element with snap finger 70c into bore 71 to reach the position shown in FIG. 3. In the position shown in FIG. 3, the ends of the snap fingers move beyond the end of the compound gear and spring outwardly to hold the compound gear and shifter element as one.

The compound gear and sleeve element 70 are supported within the transmission housing on a shaft 74 extending through a central bore 76 provided in element 70. Ends of the shaft are received within wells 78, 80 presented by housing sections 24, 22. Gear 65 and the sleeve on which it is mounted are shiftable axially on shaft 74 and are also rotatable relative to the shaft.

A shift lever 44 has earlier been described and its pivot mounting 46 is disposed above shaft 74. Formed integrally with the lower end of the shift lever are a pair of laterally spaced cam members 82 which, with the transmission unit assembled, straddle shifting sleeve element 70 with cam projections at one end adjacent flange means 70b and at the other end adjacent the base of pinion gear 66. With the parts as illustrated in solid outline in FIG. 3, the teeth of pinion gear 66 engage the teeth of drive gear 52, i.e., a position engaging the drive gear. Swinging of shift lever 44 in a clockwie direction in FIG. 3 to move it to the position shown in dashed outline causes axial shifting of compound gear 65 along shaft 74 and moves the teeth of the pinion gear out of engagement with the teeth of the drive gear, i.e., shifts the gearing to a nonengaged or neutral position.

Adjacent compound gear 65 is another compound gear 84, including a ring gear 86 and a pinion gear 88 which again may be formed as an integral piece from molded plastic. This compound gear is rotatably supported within the transmission housing on a shaft 90 passing through the center of the compound gear. Shaft 90 has ends mounted and received within shaft wells 92, 94 formed in housing sections 22, 24.

With the transmission unit assembled, gear 86 is positioned to one side of gear 67, with sufficient lateral clearance provided between the two to accommodate axial shifting of gear 67 as earlier described. Pinion gear 88 extends across the periphery of gear 67 with the teeth of the pinion gear engaging the teeth of gear 67. Pinion gear 88 has sufficient length to accommodate shifting of compound gear 65 with engagement of the pinion gear and ring gear 67 always maintained.

Referring to FIGS. 1 and 6, the vehicle is driven through energizing of an electric motor, shown generally at 96. The motor includes the usual motor proper housed within a housing 98 and output shaft 100 which extends out from one end of the housing. Suitably secured in fixed position on the end of the output shaft is what is referred to as a driving gear 102.

In assembling the structure shown in FIG. 1, a transmission unit may be assembled comprising the mating housing sections 24, 22 secured together and housing therein drive gear 52 and coacting compound gears 65, 84, together with the shaft supporting these compound gears and the shift lever 44, which is actuated to shift compound gear 65 to establish either a disengaged or engaged position with the drive gear. The electric motor and driving gear 102 may then be incorporated with the assembly by placing the housing of the motor against bosses 104, formed as part of housing section 22 (see FIG. 5). Placing the motor housing against bosses 104 moves driving gear 102 through opening 106 provided in housing section 22, and places the teeth of driving gear 102 in engagement with the teeth of gear 86 of compound gear 84 (this ring gear also being referred to herein as an input gear in the transmission assembly unit). Fasteners, such as elongate screws extending through stems 108 formed as part of housing section 24 and through bosses 104 and into threaded receptors (not shown) provided in the housing of the electric motor, function to hold the electric motor in place with driving gear 102 in engagement with gear 86.

Describing soee of the advantages of the vehicle and the transmission herein disclosed, it will be noted, and with reference to FIGS. 3 and 4, that the gearing in the transmission unit rotates about horizontal transversely extending axes and is clustered about drive gear 52, which is the final gear in the drive train transmitting drive to the vehicle drive shaft 12. Driving gear 102 is located slightly beyond drive gear 52, with intermediate gearing in the form of the two compound gears providing a driving connection between the driving gear and the driven gear. The organization described is compact and well suited for incorporation with a toy vehicle. Engagement and disengagement of the gearing in the transmission results from axially shifting compound gear 65 to move its pinion gear into and out of engagement with the drive gear, this pinion gear being located directly above the drive gear. This shifting movement is produced directly through swinging of shift lever 44, which, in a manner of speaking, is directly coupled with compound gear 65 through shifting sleeve element 70. The shifting lever extends upwardly from the transmission unit to be readily accessible by the user of the vehicle. Operating parts are protectively encased by the transmission housing with the drive gear being the lowest portion of the assembly. The gearing requires only two internally supported shafts, i.e., shaft 74, 90, with the output shaft of the motor 96 providing the support for driving gear 102. Drive gear 52 is rotatably supported within the housing through hub 56 described and its mounting within sleeve portion 60, which is presented by the transmission housing.

While a preferred embodiment of the invention has been described, it should be obvious that variations and modifications thereto are possible without departing from the invention.

It is claimed and desired to secure by Letters Patent:

1. In a vehicle which includes a driven axle shaft extending transversely of the vehicle having wheels secured thereto:
   a drive gear concentric with the axle shaft nonrotatably connected to the shaft, the drive gear having an integral hub on each of opposite sides thereof,
   a pinion gear shiftably mounted above the drive gear having one position engaging the drive gear and shiftable laterally to disengage from the drive gear,
   a shift lever mounted in a position projecting upwardly from the pinion gear actuatable to shift the pinion gear,
   an electric motor with output shaft mounted with the output shaft paralleling the axle shaft and having a driving gear mounted thereon,
   a multiple gear gear train mounted so as to establish a driving connection between said driving gear and said pinion gear, and
   a transmission housing enclosing the driving gear, gear train, pinion gear and drive gear, the housing including sleeve portions rotatably receiving said hubs of the drive gear and thus rotatably mounting the drive gear and the axle shaft connected to the drive gear.

2. The vehicle of claim 1, wherein the electric motor includes a motor housing from which its output shaft extends, said motor housing being outside said transmission housing and secured to said transmission housing thus to mount the motor output shaft, the gears of said gear train and pinion gear being mounted on shafts having ends supported on the transmission housing.

3. In a vehicle including a vehicle frame, a driven axle shaft having vehicle wheels secured to the ends thereof, a housing and transmission assembly unit secured to the vehicle frame and providing a mounting for the axle shaft, said assembly unit comprising:
   a drive gear concentric with the axle shaft and nonrotatably connected to the shaft, the drive gear having an integral hub on each of opposite sides thereof,
   a pinion gear disposed adjacent the drive gear having one position engaging the drive gear and laterally shiftable to another position where it disengages from the drive gear,
   a shift lever connected to the pinion gear for shifting the pinion gear,
   an input gear and other gears drivingly connecting the pinion gear and input gear for effecting a speed reduction between the input and pinion gears, and
   a transmission housing enclosing the drive gear, pinion gear, and other gears including sleeve portions rotatably receiving said hubs and thus rotatably mounting the drive gear.

4. The vehicle of claim 3, which further includes an electric motor with motor housing and output shaft extending from the motor housing, a driving gear connected to the motor output shaft, and means mounting said motor housing on said transmission housing with the motor housing outside the transmission housing and with said driving gear within the transmission housing and engaging said input gear.

5. In a toy vehicle including a vehicle frame and two driven wheels:
   a driven axle shaft having ends of equal radius mounting the driven wheels of the vehicle; and the axle shaft having a noncircular mid-region with a portion projecting radially of the shaft a distance greater than the radius of the shaft ends; and
   a housing and transmission assembly unit mounted on the vehicle frame and providing a mounting for the axle shaft; said assembly unit including a drive gear with an integral hub on each of opposite sides thereof; transmission gearing including a pinion gear adjacent the drive gear and engaging the drive gear, an input gear, and other gears drivingly connecting the input gear and the pinion gear and for effecting a speed reduction between the input gear and pinion gear; the transmission gearing producing a driving connection between the input gear and drive gear and at least one gear of the transmission gearing being axially shiftable to break said driving connection; and a transmission housing enclosing the drive gear and transmission gearing; said transmission housing including sleeve portions rotatably receiving said hubs of the drive gear and further including end walls abutting against ends of said hubs; said sleeve portions rotatably mounting the drive gear,
   said drive gear having a noncircular passage extending axially therethrough and said axle shaft extending through and within said passage with the noncircular mid-region of the axle shaft relatively nonrotatably received with said passage; at least one of said end walls of said transmission housing having an opening in the side thereof of a size sufficient to enable said noncircular mid-region of the axle shaft to pass therethrough when mounting the axle shaft within said drive gear.

6. The vehicle of claim 5, wherein the axes of the gears of said transmission gearing parallel the axis of the drive gear and wherein said transmission housing comprises a pair of mating housing sections fitting against each other in a mating relation with relative movement in a direction paralleling said axes.

7. The vehicle of claim 6, wherein the gears of said transmission gearing are clustered in a region disposed above the axle shaft, and the transmission gearing includes an upper portion enclosing the gears of said transmission gearing and a lower portion enclosing the drive gear depending from said upper portion and which projects below said region where the gears of the transmission gearing are clustered.

* * * * *